United States Patent [19]

Ong et al.

[11] Patent Number: 5,698,483
[45] Date of Patent: Dec. 16, 1997

[54] PROCESS FOR PREPARING NANOSIZED POWDER

[75] Inventors: Estela T. Ong, Chicago, Ill.; Vahid Sendijarevic, Troy, Mich.

[73] Assignee: Institute of Gas Technology, Des Plaines, Ill.

[21] Appl. No.: 406,173

[22] Filed: Mar. 17, 1995

[51] Int. Cl.$^6$ ................................ C01B 13/14
[52] U.S. Cl. ................ 501/12; 501/1; 501/94; 75/362; 252/315.01; 252/315.2; 252/315.3; 423/3; 423/21.1; 423/23; 423/49; 423/53; 423/62; 423/69; 423/87; 423/89; 423/99; 423/111; 423/155; 423/263; 423/593; 423/604; 423/605; 423/606; 423/608; 423/618; 423/624; 423/635; 423/641; 423/138; 524/403; 524/406; 524/408; 524/413
[58] Field of Search ................... 501/1, 12, 94; 75/362, 953; 423/592, 593, 604, 605, 606, 608, 617, 618, 624, 635, 641, 263, 138, 3, 21.1, 23, 49, 53, 62, 69, 87, 89, 99, 111, 155; 252/315.1, 315.2, 315.3, 315.01; 524/403, 404, 406, 408, 413

[56] References Cited

U.S. PATENT DOCUMENTS

| | | | |
|---|---|---|---|
| 2,900,245 | 8/1959 | Beller | 75/362 |
| 3,330,697 | 7/1967 | Pechini | 427/79 |
| 4,058,592 | 11/1977 | Quets . | |
| 4,065,544 | 12/1977 | Hamling et al. | 423/608 |
| 4,572,843 | 2/1986 | Saito et al. | 427/53.1 |
| 4,915,733 | 4/1990 | Schutz et al. | 75/288 |
| 5,049,371 | 9/1991 | Rinn et al. | 423/592 |
| 5,057,147 | 10/1991 | Shaffer et al. | 75/252 |
| 5,093,289 | 3/1992 | Braetsch et al. | 501/80 |
| 5,149,361 | 9/1992 | Iyori et al. | 75/233 |
| 5,177,036 | 1/1993 | Kunst et al. | 501/84 |
| 5,250,101 | 10/1993 | Hidaka et al. | 75/362 |
| 5,338,334 | 8/1994 | Zhen et al. | 75/362 |
| 5,338,714 | 8/1994 | Rousset et al. | 501/127 |
| 5,352,269 | 10/1994 | McCandlish et al. | 75/351 |
| 5,358,695 | 10/1994 | Helble et al. | 501/1 |

FOREIGN PATENT DOCUMENTS

| | | |
|---|---|---|
| 2091398 | 1/1972 | France . |
| 8801990 | 3/1988 | WIPO . |
| 9416989 | 8/1994 | WIPO . |

OTHER PUBLICATIONS

Chick, L. A. et al., "Synthesis of Air–Sinterable Lanthanum Chromite Powders", Proceedings of the First International Symposium on Solid Oxide Fuel Cells, vol. 89–11, pp. 171–187, 1989 (no month).

*Primary Examiner*—Michael Marcheschi
*Attorney, Agent, or Firm*—Speckman, Pauley & Fejer

[57] ABSTRACT

A process for producing nano size powders comprising the steps of mixing an aqueous continuous phase comprising at least one metal cation salt with a hydrophilic organic polymeric disperse phase, forming a metal cation salt/polymer gel, and heat treating the gel at a temperature sufficient to drive off water and organics within the gel, leaving as a residue a nanometer particle-size powder.

6 Claims, No Drawings

PROCESS FOR PREPARING NANOSIZED POWDER

BACKGROUND OF THE INVENTION

1. Field of the Invention

This invention relates to a process for producing nanometer particle-size ceramic powders for use as starting powders for high technology ceramics. In particular, this invention relates to a process for preparing nanometer particle-size powders from an aqueous metal salt solution and a hydrophilic organic material.

2. Description of Prior Art

High technology ceramics are known for possessing a combination of good thermal, chemical, mechanical, and electronic properties, making them unique for certain technical applications. Their usefulness, however, depends upon the characteristics of the ceramic powders used as starting powders which are sintered to produce the ceramic product. In general, to achieve desirable characteristics in the finished products, a ceramic powder should consist of particles with a narrow size distribution in the submicron or nanometer size range. In addition, to avoid pores larger than the primary particle size, the particles should be discrete, rather than attached together in agglomerated clusters. Agglomerated clusters often produce low-density green ceramics and leave numerous large pores after sintering. Finally, it is important that the ceramic powder be free of contaminants to insure purity of the resulting high technology ceramic.

However, nanometer particle-size powders are generally expensive and difficult to prepare in large quantities, thus limiting their applications to high technology ceramics. Accordingly, to extend the use and improve the function of such ceramics, a simple, low cost and upscalable process for making nanometer particle-size powders is desirable.

One known method of preparing powder formulations used in high technology ceramics involves the calcination of a mechanically ground mixture of metal oxides and/or carbonates in definite proportions. However, the milling and grinding introduces contaminants from abrasive materials which have a detrimental effect on the desirable properties and which introduce a variance into each batch of powder prepared. In addition, the mechanically ground mixture requires prolonged calcination at high temperatures which promotes crystallite coarsening, an undesirable consequence in the fabrication of dense fine grain ceramics.

U.S. Pat. No. 3,330,697 to Pechini teaches a process for preparing lead and alkaline earth titanates and niobates from resin intermediates made from alpha-hydroxycarboxylic acids, such as citric acid, in which a precipitate of a hydrated oxide or alkoxide and an alphahydroxy carboxylate of titanium, niobium, and zirconium is mixed with citric acid in a polyhyroxy alcohol which is liquid below about 100° C., dissolving therein at least one basic metal compound from the group of oxide, hydroxide, carbonate and alkoxide of lead and the alkaline earth metals, and calcining the composition to remove the organic constituents. The resulting product includes agglomerated particles which require grinding after calcination. In addition, particle size is very difficult to control by this method.

Similarly, Chick, L. A. et al., "Synthesis of Air-Sinterable Lanthanum Chromite Powders", Proceedings of the First International Symposium on Solid Oxide Fuel Cells, vol. 89-11 pages, 171-187, teaches a process for synthesizing lanthanum chromites in which metal nitrates and glycine or some other low molecular weight amino acid are dissolved in water and the resulting solution is boiled down until it thickens and ignites, producing ash that contains the oxide product. Thereafter, the oxide product is calcined, sonicated and dry-pressed. This process, too, produces agglomerates which require grinding after calcination, thereby introducing contaminants into the ceramic powder. In addition, particle size is very difficult to control.

U.S. Pat. No. 4,572,843 to Saito et al., teaches insulating compositions which are rendered to be conductive by heating, which insulating compositions include an organic polymeric material containing a metal source, a thick film paste containing a metal oxide film, and an organic polymeric material which is carbonized by heating. When the organic polymeric material containing the metal source, such as a metal powder or an organometallic compound is subjected to heat, it is decomposed and evaporates. The metallic component in the organic polymeric material is left as a precipitate and welded to each other so as to form a conductor.

U.S. Pat. No. 5,352,269 to McCandlish et al. teaches a process for producing nanometer-size particles in which precursor chemicals which define the composition of the final product are dissolved in a solvent and mixed to yield a solution which is completely homogeneous on a molecular level. The solvent is then evaporated at a sufficient rate that the components of the homogenized solution are precipitated as a homogenized solid precursor powder.

Other known processes for producing nanometer-size particles include vaporizing precursor metals in a low vacuum and allowing the vapor to oxidize and cool; hydrolyzing metal alkoxide or organometallic precursors in aqueous solutions to produce hydroxides or oxides of high surface areas; incorporating metal salts into a polymer solution and curing the mixture to transform the polymer into a char, the resulting char/metal mixture being oxidized to remove the char and oxidize the metal; emulsifying a water soluble metal salt with an organic additive and vacuum distilling the emulsion to remove the water while the organic is first charred in a controlled atmosphere and then pyrolyzed to remove carbon and transform the metal salt into an oxide.

U.S. Pat. No. 5,338,334 to Zhen et al., teaches a process for producing a nanometer-size ceramic powder by incorporating a solution of metal salts within a polymeric foam and calcining the foam to eradicate the organics therein, leaving behind a product in the form of a high surface area metal oxide nano powder. This process, however, like other nano powder producing processes, is not cost effective due to the high polymer-to-oxide ratio which, for 8 mole percent $Y_2O_3$ stabilized $ZrO_2$(8YSZ) is typically 50:1. Furthermore, the polymeric foam, typically polyurethane, generates environmentally hazardous organic vapors during calcination.

U.S. Pat. No. 5,093,289 teaches a process for producing a ceramic material comprising a skeleton reaction-bonded silicon powder in which a foam matrix is coated with a suspension of silicon powder, synthetic resin and solvent, and is subjected to a heat treatment during which the foam matrix is expelled and the silicon is stabilized.

U.S. Pat. No. 5,338,714 teaches composite alumina-metal powders produced by preparing an aqueous solution of a mixed carboxylic salt of aluminum and one or several transition metals, precipitating the mixed salt by an organic solvent miscible with water, in which the salt is stable and insoluble, separating the precipitate obtained from the liquid phase and recovering the precipitate in the form of a micronic powder of mixed salt (precursor), subjecting the precursor to a heat decomposition treatment in the presence of oxygen to decompose the precursor and produce a mixed amorphous oxide of aluminum and the transition metal, and reducing the amorphous mixed oxide by heat treatment in a reducing atmosphere.

U.S. Pat. No. 5,250,101 teaches a process for producing fine powder comprising heating an organic acid metal salt in the presence of palladium, which lowers the thermal decomposition temperature of the salt, at a temperature elevation rate of 0.5° to 20° C./minute and thermally decomposing the organic acid metal salt in the presence of palladium at a temperature of less than 400° C.

U.S. Pat. No. 5,177,036 teaches a porous granular ceramic material prepared by calcining a mixture of clay and a particulate combustible material at time and temperature conditions such that a substantial amount of the clay minerals remain unvitrified and at least a portion of the combustible material is burned off. Powder producing processes are also taught by U.S. Pat. No. 4,915,733, U.S. Pat. No. 5,057,147, and U.S. Pat. No. 2,900,245.

In contrast to the various known processes for producing powders, we have discovered a process which is simple and straight forward in that it does not require special equipment or controlled atmospheres, the starting materials are common and readily available, and the amount of additives is low and environmentally acceptable.

SUMMARY OF THE INVENTION

It is an object of this invention to produce nano size ceramic powders.

It is another object of this invention to produce nano size ceramic powders without introducing impurities into the powders.

It is another object of this invention to produce ceramic powers which are chemically uniform.

It is yet another object of this invention to provide a generic, low cost process for producing high purity, nano size, single or multi-component ceramic powders.

It is yet another object of this invention to provide a process for producing nano size ceramic powders which requires no special controlled atmospheres.

It is yet another object of this invention to provide a process for producing nano size ceramic powders which is essentially environmentally benign.

These and other objects are achieved by a process for producing nanometer size powders in accordance with one embodiment of this invention in which an aqueous solution comprising at least one metal cation salt is mixed with a hydrophilic organic material to form a metal salt/organic mixture. The metal salt/organic mixture is subsequently heat treated at a temperature sufficient to remove the organic material and water from the mixture, leaving behind a nanometer particle-size powder. The process for producing nanometer particle-size powders in accordance with this invention produces an intermediate gelled hydrophilic polymer structure in which the aqueous, ionic solution is "frozen", thereby preserving uniform dispersion of the metal ions within the polymer structure. In addition, the process requires only two major raw materials, an aqueous salt solution and a hydrophilic polymer. In comparison to other known processes for producing nanometer particle-size powders in which the polymer-to-oxide ratio is very high, typically on the order of 50:1, the organic media-to-powder product ratio in accordance with the process of this invention is as low as 1.7:1 for 8YSZ. Finally, the gaseous products produced in accordance with the process of this invention are essentially environmentally benign, namely carbon dioxide ($CO_2$) and water ($H_2O$).

DESCRIPTION OF PREFERRED EMBODIMENTS

In accordance with the process of this invention, a metal cation salt/polymer gel or colloid is formed by mixing an aqueous continuous phase comprising at least one metal cation salt with a hydrophilic organic polymeric disperse phase. By the term "gel" as used throughout the specification and the claims, we mean a colloid in which a disperse phase is combined with a continuous phase to produce a viscous gel-like product. In the gel formed in accordance with the process of this invention, the disperse or colloidal phase is the hydrophilic organic polymer and the continuous phase is water. The metal cation salt is dissolved in the water. When the hydrophilic organic polymer is added to the aqueous metal salt solution, a gel is formed by virtue of the gelling property of the polymer. In this process, the hydrophilic organic polymer absorbs the liquid on to its structure due to chemical affinity. The amount and nature of the water absorbed depends on the chemical composition of the polymer. The hydrophilic absorption of the water causes the polymer to swell. This action is distinguishable from a sponge, for example, which absorbs water due to capillarity, although it may also absorb water by chemical absorption as in the process of this invention. However, the powder product produced from the capillary water is different from the powder product from the chemically absorbed water.

We have determined that hydrophilic organic materials serve as good media for uniformly absorbing the metal ions of aqueous soluble salts. Hydrophilic polymers, such as polyoxyethlene glycol and some polyurethanes have high capacities for retaining water. When a hydrophilic polymer is added to an aqueous metal salt solution, it swells as it absorbs the solution into its structure. The product is a gel with the metal salt solution "frozen" within the dispersed polymeric network. If the metal salt solution is dilute and the polymer added is not enough to gel the mixture, excess water may be dried off until the mixture is thick enough to form a gel. Upon calcination of the salt/polymer mixture, the polymer is decomposed leaving a high surface metal oxide powder. These metal oxide powders, as we have determined by use of an electron microscope, are of nano size. By nanometer particle-size powders, we mean powders having a predominate portion of particle sizes less than 100 nanometers in diameter.

$Y_2O_3$-stabilized zirconia, an ionic conductor used as an electrolyte in high temperature solid oxide fuel cells, with surface areas in excess of 100 $m^2/g$ has been routinely prepared by the process of this invention. All hydrophilic organic materials such as carbohydrates (sucrose starches and cellulose) and carbohydrate derivatives, hydrophilic homopolymer and copolymers of ethylene oxide, 2-hydroxethylenemethacrylate, hydroxyalkylmethacrylates, hydroxyalkylacrylates, acrylamide, and n-vinylpyrrolidone; hydrophilic polymers such as polyurethanes, polyurethane-acrylic, and polyurethane-methacrylic copolymers and interpenetrating polymer networks; and proteins derived from animal-protein-gelatins; and mixtures thereof are suitable for use in the process of this invention.

The aqueous metal cation salt solution used in the process of this invention comprises at least one metal cation salt selected from the group consisting of chlorides, carbonates, hydroxides, isopropoxides, nitrates, acetates, epoxides, oxalates, and mixtures thereof. Metal cations suitable for use in the process of this invention are selected from the group consisting of at least one metal of Group 1A, 2A, 3A, 4A, 5A and 6A of the Periodic Table, transition metals, lanthanides, actinides and mixtures thereof. As previously stated, upon formation of the metal cation salt/polymer gel, the gel is heat treated preferably in air at a temperature sufficient to drive off the water and the organics within the gel, leaving as a residue a nanometer particle-size powder. In accordance with one embodiment of the process of this invention, the gel is heat treated at a temperature in the range of about 300° C. to about 1000° C. In accordance with a particularly preferred embodiment of this invention, the gel is heat treated at a temperature in the range of about 450° C. to about 750° C.

In accordance with one preferred embodiment of the process of this invention, the metal cation salt/polymer gel is first dried to form a clear viscous fluid which is subsequently calcined to decompose the organic polymer, leaving behind a high surface metal oxide powder.

As compared to the various known processes for producing nanometer particle-size powders, the process of this invention is simple and straight forward. No special equipment is required and the entire process, including the heat treatment of the metal cation salt/polymer gel, can be carried out in air. As will be seen from the following examples, the starting materials are common and readily available, and the amount of additive is low and environmentally acceptable.

EXAMPLE I

A 20 gram salt solution was prepared by dissolving 8.4 grams $ZrO(NO_3)_2 \cdot 6.2H_2O$ and 1.55 grams $Y(NO_3)_3 \cdot 5H_2O$ in water to make a solution having a total volume of 100 ml. When heat treated to form the oxide, this composition will have a molar composition of 8% $Y_2O_3$ and 92% $ZrO_2$. This salt solution was added to 42.5 grams Henkel Chemical Grade 400, polyethylene glycol. The mixture was mixed with a spatula for about 30 seconds to a thick paste. The mixture was then fired at 650° C. to burn off the organic. The resulting powder weighed 1.4 grams (for an organic-to-powder ratio of 14:1) and had a surface area of 102 $m^2/g$ as measured by the BET $N_2$ absorption technique.

EXAMPLE II

The test of Example I was repeated using 42.5 grams of a salt solution, prepared from a solution as described in Example I and then diluted with water to four times the original solution volume and 42.5 grams of Henkel Grade 400 polyethylene glycol. After firing at 650° C., the resulting powder was determined to have a surface area of 115 $m^2/g$.

EXAMPLE III

In this example, Dow Chemical Grade 4500 polyethylene glycol was tested as an organic medium. 20 grams of a salt solution prepared as described in Example I were added to 20 grams of the Dow powder and stirred to a clear solution. This solution was allowed to dry on a watch glass placed on a low temperature (50°–70° C.) hot plate, resulting in the formation of a viscous fluid. After placing it in an oven at 110° C. for about 2 hours, it gelled. The gel was heated to 650° C. for 3 hours. The resulting powder had a measured surface area of 30 $m^2/g$.

EXAMPLE IV

The process described in Example III was repeated, but this time only 10 grams of the salt solution were used to 20 grams of the polyethylene glycol powder. The resulting oxide powder had a measured surface area of 62 $m^2/g$.

EXAMPLE V

Because polyethylene glycol burns completely at a temperature as low as 450° C., we investigated the effect of temperature on surface area. 240 grams of the salt solution as described in Example I was added to 60 grams of the Dow Chemical Grade 4500 polyethylene glycol in a beaker and the mixture was stirred while being slowly dried at temperatures of 50°–70° C. on a hot plate. The solution thickened to a viscous liquid and then to a gelatinous cake after placing in an oven at 110° C. The cake was fired at 450° C. for 90 minutes. The measured surface area of the resulting powder was 150 $m^2/g$. A part of the powder thus formed was refired at 550° C. for 90 minutes and another part of the powder was fired at 650° C. for 90 minutes. The resulting powders had surface areas of 143 and 105 $m^2/g$, respectively.

EXAMPLE VI

The effect of polymer-to-salt solution ratio was investigated. In Example IV, this ratio was 1:2 and in Example V, this ratio was 1:4. A ratio of 1:10 was further tested. 50 grams of the Dow Chemical Grade 4500 polyethylene glycol and 500 grams of the salt solution prepared in accordance with Example I, were mixed, dried, gelled, and fired at 500° C. for 60 minutes. The resulting powder surface area was 135 $m^2/g$. The theoretical yield of 8YSZ powder from the salt solution as described in Example I is 6.7 g per 100 g. Therefore, the polymer-to-oxide-powder ratio is 1:0.67 or 1.7:1 for a mixture starting with a polymer-to-salt-solution of 1:10.

EXAMPLE VII

To further demonstrate the general principle that hydrophilic polymer materials, not limited to polyurethane or polyethylene glycol, can be used, 100 grams each of Dow Chemical 4000 and 100,000 grade methylcellulose were added to separate solutions, each prepared by dissolving 16.7 grams zirconyl nitrate and 3.3 grams yttrium nitrate in 100 ml of water. The solutions were separately stirred over a hot plate until viscous, or gelled, and clear liquids were obtained. The liquids were fired at 650° C. for 1 hour. The surface areas of the powders produced were 24 $m^2/g$ for the 4000 grade methylcellulose and 58 $m^2/g$ for the 100,000 grade methylcellulose.

EXAMPLE VIII

A solid hydrophilic polyurethane was prepared by reacting a mixture of demoisturized PLURACOL E4000 (polyoxyethylene glycol of 4000MW, BASF) and trimethylol propane (TMP crosslinker) with 4, 4'-methylene bis (phenyl isocyanate) at an isocynate index of 105. The mixture of polyols, preheated at 80° C., was vigorously blended with isocyanate, preheated at 70° C. The mixture was poured into a teflon-covered mold, compression molded at the gel point and cured for 1 hour at 100° C. Immediately after demolding, polyurethane samples were post cured for 12 hours at 100° C. The solid hydrophilic polyurethane was soaked in an aqueous solution of zirconium nitrate and yttrium nitrate prepared according to Example I. It swelled as it absorbed the salt solution. The soaked polyurethane was then fired to 350° C. without a separate drying step to drive off the water and the organic to obtain a fine powder.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A process for producing nanosize powders comprising the steps of:

mixing an aqueous continuous phase comprising at least one metal cation salt with a hydropolymeric organic polymeric disperse phase, forming a metal cation salt/polymer gel; and heat treating said gel at a temperature sufficient to drive off water and organics within said gel, leaving as a residue a nanometer size powder.

2. A process in accordance with claim 1, wherein said hydrophilic organic polymeric disperse phase comprises an organic material selected from the group consisting of carbohydrates derivatives, polymers, proteins derived from animal protein-gelatins, and mixtures thereof.

3. A process in accordance with claim 1, wherein said gel is heat treated at a temperature in the range of about 300° C. to 1000° C.

4. A process in accordance with claim 1, wherein said at least one metal cation salt is selected from the group consisting of chlorides, carbonates, hydroxides, isopropoxides, nitrates, acetates, epoxides, oxalates, and mixtures thereof.

5. A process in accordance with claim 1, wherein said metal cations are selected from the group consisting of at least one metal of Group 1A, 2A, 3A, 4A, 5A, 6A, 1B, 2B, 3B, 4B, 5B, 6B, 7B, and 8 of the Periodic Table, lanthanides, actinides and mixtures thereof.

6. A process in accordance with claim 2, wherein said hydrophilic polymers are selected from the group consisting of hydrophilic homopolymers and copolymers of ethylene oxide, 2-hydroxethylenemathacrylate, hydroxyalkylmethacrylates, hydroxyalkylacrylates, acrylamide, and n-vinylpyrrolidone.

* * * * *